UNITED STATES PATENT OFFICE.

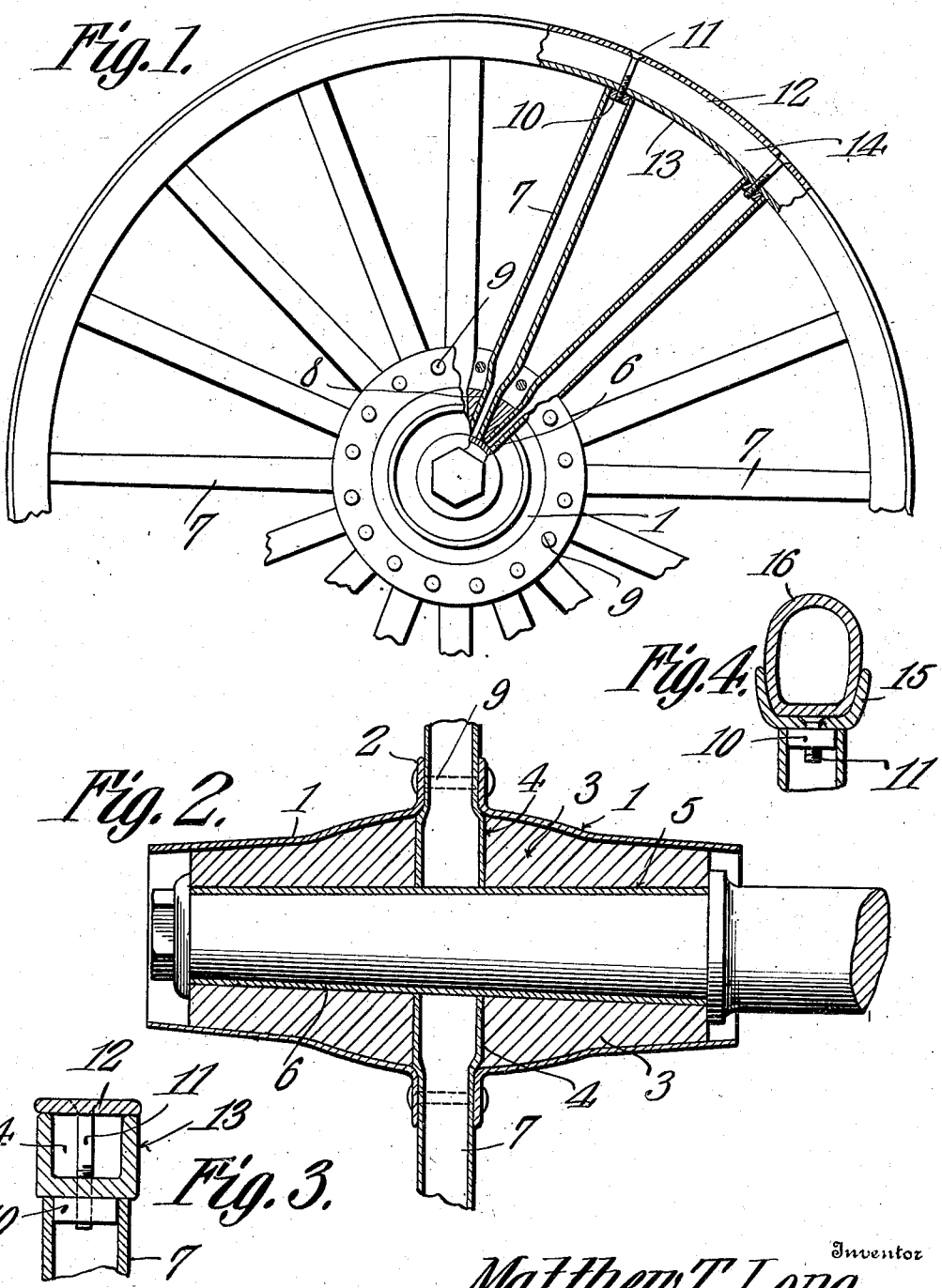

MATTHEW T. LONG, OF HELENA, OKLAHOMA.

VEHICLE-WHEEL.

No. 918,756.  Specification of Letters Patent.  Patented April 20, 1909.

Application filed September 14, 1908. Serial No. 453,001.

*To all whom it may concern:*

Be it known that I, MATTHEW T. LONG, a citizen of the United States, residing at Helena, in the county of Alfalfa and State of Oklahoma, have invented a new and useful Vehicle-Wheel, of which the following is a specification.

This invention relates to vehicle wheels, and its object is to provide a wheel formed practically entirely of metal and which is no heavier or more expensive than wooden wheels of the same size.

Another object is to provide a metallic wheel the spokes of which are designed to be connected to the rim or felly and hub, without the necessity of brazing, soldering or screwing the parts together.

A further object of the invention is to provide a wheel wherein the spokes can be simultaneously tightened against the rim or felly by the manipulation of the box within the hub.

A still further object is to provide a wheel formed of parts all of which can be readily obtained upon the market at comparatively slight cost and which can be assembled quickly to produce a light, durable and efficient wheel.

Another object is to provide an all-metal wheel having the appearance of a wooden wheel.

With these and other objects in view the invention consists of certain novel details of construction and combinations of parts hereinafter more fully described and pointed out in the claim.

In the accompanying drawings the preferred form of the invention has been shown.

In said drawings:—Figure 1 is a view partly in side elevation and partly in section of a portion of a wheel constructed in accordance with the present invention. Fig. 2 is an enlarged central transverse section through the hub of the wheel, two of the spokes being shown in section. Fig. 3 is an enlarged transverse section through a portion of the rim or felly of the wheel and through the adjoining portions of one of the spokes and of the tire. Fig. 4 is a view similar to Fig. 3 but showing a different kind of tire upon the felly.

Referring to the figures by characters of reference 1, 1, designate oppositely disposed similar substantially frusto-conical hub sleeves formed of metal and provided at their large or inner ends with annular flanges 2. The body of the hub may be formed of wood or other solid substance, as indicated at 3 and the sleeves 1 fit snugly upon it. Formed radially within the middle portion of the body 3 are slots 4 designed to receive the inner ends of the spokes of the wheel, said slots extending into the axle-receiving opening 5 in the hub and being normally closed at their inner ends by the tapered box 6 which is removably mounted within the opening 5. The walls of each of the slots 4 are parallel as shown in Figs. 1 and 2.

The spokes of the wheel are formed of metal tubes 7 the inner ends of which are flat as indicated at 8 so as to fit snugly within the slots 4. These spokes not only extend between the flanges 2, but also between the bolts or rivets 9 which are used to draw the flanges toward each other and thus hold the sleeves 1 tightly clamped upon the body 3. Nuts 10 are tightly secured within the outer ends of the spokes and are detachably engaged by tire bolts 11 extending through a tire 12 which is mounted on the rim 13 of the wheel. As shown especially in Fig. 3 this rim is preferably formed of channel iron with the flanges thereof extending outwardly so that the tire 12 will rest upon the edges of the flanges and thus form an annular compartment 14 within the rim. It is of course to be understood however that if preferred the rim may be constructed as shown at 15 in Fig. 4, this construction being preferable where a cushion or pneumatic tire 16 is used.

When it is desired to assemble the parts of the wheel herein described the spokes are placed with their flat end portions 8 within the slots 3 and with the inner ends of said portions projecting short distances into the opening 5, it being of course understood that the box 6 is not in position within the hub during this operation. The tire is then placed tightly on the felly, preferably by being heated and shrunk on as is usual when wooden rims are employed. The tire is bolted in place with the common tire bolts the nuts of which are of such size as to fit tightly into the hollow outer ends of the spokes. After the nuts are firmly secured in place on the rim the rim is positioned around the outer ends of the spokes and said spokes shifted radially outward so that their outer ends will cover and surround the nuts which will fit tightly in the spoke ends. If a rubber tire is used the nuts for holding the ends of the spokes in place must still be used and can be either riveted or bolted in place before the rubber tire is placed on the rim. After the rim has been tightly secured to the spokes in this manner the box 6 which, as heretofore stated, is slightly tapered, is inserted into the hub and between the inner ends of the spokes. Said box is then driven longitudinally and acts as a wedge and thus forces all of the spokes simultaneously outwardly along radial lines. The rim 13 and the spokes are thus tightly clamped together and the entire wheel rendered rigid. Inasmuch as the walls of the slots 3 are parallel it will be apparent that when the spokes are shifted outwardly as above described no spaces will be formed between them and the walls of the slots as would be the case should said walls converge inwardly and the spokes be correspondingly shaped. It is of course to be understood that should the parts of the wheel become so worn that sufficient outward movement of the spokes could not be obtained by the insertion of the box 6, a bushing can be placed within the hub so as to force the spokes outwardly when the box is inserted into the bushing. This construction is so obvious that it is not deemed necessary to illustrate it.

Importance is attached to the fact that in a wheel such as here described it becomes unnecessary to braze, solder or screw any of the parts together, and the wheel, when finished, is not only light and durable, but has every appearance of the ordinary wooden wheel. The wheel can therefore be used advantageously upon buggies, runabouts and other light vehicles.

What is claimed is:—

A wheel comprising a hub having slots extending along radial lines, seamless tubes of uniform diameter having flattened end portions inserted into the slots, a one piece rim of channeled material surrounding and bearing against the outer ends of the tubes, nuts seated within the outer ends of the tubes, a tire extending around the rim, the flanges of said rim extending outwardly and constituting bearings for the tire, and tire-bolts extending through the tire and rim and engaging the nuts, said bolts and nuts constituting means for holding the tire, rim and tubes in predetermined relation, and means slidably mounted within the hub and bearing against the inner ends of the tubes for simultaneously shifting said tubes radially.

In testimony that I claim the foregoing as my own, I have hereto affixed my signature in the presence of two witnesses.

MATTHEW T. LONG.

Witnesses:
 C. R. ECKES,
 J. W. McCULLY.